(12) United States Patent
Uehara (10) Patent No.: US 11,754,144 B2
(45) Date of Patent: *Sep. 12, 2023

(54) DAMPER DEVICE (71) Applicant: EXEDY Corporation, Neyagawa (JP)

(72) Inventor: Hiroshi Uehara, Neyagawa (JP)

(73) Assignee: EXEDY Corporation, Osaka (JP)

( * ) Notice: Subject to any disclaimer, the term of this patent is extended or adjusted under 35 U.S.C. 154(b) by 292 days.

This patent is subject to a terminal disclaimer.

(21) Appl. No.: 17/158,364

(22) Filed: Jan. 26, 2021

(65) Prior Publication Data

US 2021/0262549 A1  Aug. 26, 2021

(30) Foreign Application Priority Data

Feb. 26, 2020  (JP) ................................. 2020-030442

(51) Int. Cl.
| | |
|---|---|
| *F16F 15/14* | (2006.01) |
| *F16F 15/121* | (2006.01) |
| *F16F 15/137* | (2006.01) |

(52) U.S. Cl.
CPC ...... *F16F 15/1414* (2013.01); *F16F 15/1217* (2013.01); *F16F 15/137* (2013.01)

(58) Field of Classification Search
CPC ... F16F 15/1414; F16F 15/1217; F16F 15/137
USPC ....................................................... 464/68.1
See application file for complete search history.

(56) References Cited

U.S. PATENT DOCUMENTS

| | | | | |
|---|---|---|---|---|
| 4,592,460 | A  * | 6/1986 | Kittel | ............... F16F 15/12353 |
| 6,837,354 | B2 | 1/2005 | Uehara | |
| 10,895,302 | B2* | 1/2021 | Ito | ....................... F16F 15/1414 |
| 11,608,863 | B2* | 3/2023 | Uehara | ..................... F16D 3/12 |

FOREIGN PATENT DOCUMENTS

JP  2004-197781 A  7/2004

* cited by examiner

*Primary Examiner* — Greg Binda
(74) *Attorney, Agent, or Firm* — United IP Counselors, LLC (57) ABSTRACT

A damper device includes a first rotor, a second rotor, a plurality of elastic members and a stopper mechanism. The stopper mechanism includes a first stopper hole, a second stopper hole and a plurality of stop members. The first and second stopper holes are provided on both circumferential sides of each of a plurality of first window holes of the second rotor so as to circumferentially extend therefrom. One or both of the first and second stopper holes communicates at one end thereof with each first window hole and extends at the other end thereof to a position radially outside one of a plurality of second window holes of the second rotor. The stop members are fixed to the first rotor. Each stop member axially penetrates each of the first and second stopper holes and is circumferentially movable within each of the first and second stopper holes.

6 Claims, 9 Drawing Sheets

DAMPER DEVICE

CROSS-REFERENCE TO RELATED APPLICATIONS

This application claims priority to Japanese Patent Application No. 2020-030442, filed on Feb. 26, 2020. The contents of that application are incorporated by reference herein in their entirety.

TECHNICAL FIELD

The present invention relates to a damper device.

BACKGROUND ART

A power transmission device including a damper device is embedded in a vehicle in order to transmit power generated in an engine toward a transmission and attenuate rotational fluctuations.

This type of damper device includes an input rotor, an output rotor and a plurality of coil springs. The plurality of coil springs are disposed in a plurality of window portions of the input rotor and a plurality of window holes of the output rotor, respectively, and elastically couple the input rotor and the output rotor in a rotational direction.

As described in Japan Laid-open Patent Application Publication No. 2004-197781, the damper device is further provided with a stopper mechanism for restricting relative rotation between the input rotor and the output rotor. The stopper mechanism is composed of a plurality of stop pins and a plurality of cutouts. The stop pins are fixed to the input rotor and pass through the cutouts provided in the output rotor, respectively.

Japan Laid-open Patent Application Publication No. 2004-197781 describes a stopper mechanism configuration that the cutouts, composing part of the stopper mechanism, are opened to the outer peripheral side. Aside from this, there has been provided another stopper mechanism configuration that circular-arc holes are provided as stopper holes so as to enable the stop pins to pass therethrough, respectively.

Enlarging a torsion angle of the output rotor with respect to the input rotor (i.e., widening of angle) is preferable for making the damper device obtain good performance of attenuating rotational fluctuations. In order to achieve widening of angle, it is required to reliably circumferentially elongate the cutouts or stopper holes in the output rotor.

However, chances are often that the radial position of the stopper holes as well as the cutouts overlaps with that of the window holes, whereby elongating the stopper holes is hindered.

BRIEF SUMMARY

It is an object of the present invention to enable a circumferentially elongated stopper hole to be formed as a component of a stopper mechanism in a damper device.

(1) A damper device according to the present invention includes a first rotor, a second rotor, a plurality of elastic members and a stopper mechanism. The first rotor includes a plurality of first window portions and a plurality of second window portions. The plurality of first window portions are disposed radially outside the plurality of second window portions. The second rotor is disposed to be rotatable relative to the first rotor. The second rotor includes a plurality of first window holes and a plurality of second window holes. The plurality of first window holes are disposed radially outside the plurality of second window holes. The plurality of elastic members are accommodated in a plurality of pairs of the first window portion and the first window hole and a plurality of pairs of the second window portion and the second window hole. The plurality of elastic members elastically couple the first rotor and the second rotor in a rotational direction. The stopper mechanism restricts an angle of relative rotation between the first rotor and the second rotor to a predetermined angular range.

Besides, the stopper mechanism includes a first stopper hole, a second stopper hole and a plurality of stop member. The first stopper hole is provided on one circumferential side of each of the plurality of first window holes of the second rotor so as to circumferentially extend therefrom. The first stopper hole communicates with the each of the plurality of first window holes at one end thereof located closer to the each of the plurality of first window holes. The first stopper hole extends at the other end thereof located farther from the each of the plurality of first window holes to a position radially outside one of the plurality of second window holes. The second stopper hole is provided on the other circumferential side of the each of the plurality of first window holes of the second rotor so as to circumferentially extend therefrom. The plurality of stop members are fixed to the first rotor. Each of the plurality of stop members axially penetrates each of the first and second stopper holes and is circumferentially movable within the each of the first and second stopper holes.

In this damper device, the first stopper hole communicates at one end thereof with each of the first window holes and extends at the other end thereof to the position radially outside one of the second window holes. Because of this, the first stopper hole can be elongated in the circumferential direction. In other words, the actuation range of the stopper mechanism can be widened, whereby the angle of relative rotation (torsion angle) between the first and second rotors can be widened to one side in the rotational direction.

(2) Preferably, the second stopper hole communicates with the each of the plurality of first window holes at one end thereof located closer to the each of the plurality of first window holes and extends at the other end thereof located farther from the each of the plurality of first window holes to a position radially outside another of the plurality of second window holes.

In this case, similarly to the first stopper hole, the second stopper hole can be also elongated in the circumferential direction, whereby the torsion angle between the first and second rotors can be widened to the other side in the rotational direction.

(3) Preferably, the first and second stopper holes are made in shape of circular arcs having pitch radii equal to each other.

(4) A damper device according to another aspect of the present invention includes a first rotor, a second rotor, a plurality of first elastic members and a stopper mechanism. The first rotor includes a plurality of first window portions. The second rotor is disposed to be rotatable relative to the first rotor and includes a plurality of first window holes. The plurality of first elastic members are accommodated in a plurality of pairs of the first window portion and the first window hole and elastically couple the first rotor and the second rotor in a rotational direction. The stopper mechanism restricts an angle of relative rotation between the first rotor and the second rotor to a predetermined angular range.

Besides, the stopper mechanism includes a first stopper hole, a second stopper hole and a plurality of stop members. The first stopper hole is provided on one circumferential side of each of the plurality of first window holes at an interval therefrom and is made in shape of a circular arc having a first pitch radius. The second stopper hole is provided on the other circumferential side of the each of the plurality of first window holes and is made in shape of a circular arc having a second pitch radius smaller than the first pitch radius. The second stopper hole communicates with the each of the plurality of first window holes at an end thereof located closer to the each of the plurality of first window holes. The plurality of stop members are fixed to the first rotor. Each of the plurality of stop members axially penetrates each of the first and second stopper holes and is circumferentially movable within the each of the first and second stopper holes.

The first stopper hole is herein provided at an interval from each first window hole. In other words, the first stopper hole does not communicate with each first window hole. Because of this, degradation in strength can be inhibited in comparison with a configuration that the first stopper hole communicates with each first window hole. Besides, the first stopper hole is made in the shape of the circular arc having the relatively large first pitch radius. Hence, the first stopper hole can be elongated in the circumferential direction. Consequently, the actuation range of the stopper mechanism can be widened, whereby the angle of relative rotation (torsion angle) between the first and second rotors can be widened to one side in the rotational direction.

On the other hand, the second stopper hole communicates at one end thereof with each first window hole. Because of this, the second stopper hole can be elongated in the circumferential direction, whereby the angle of relative rotation (torsion angle) between the first and second rotors can be widened to the other side in the rotational direction.

Moreover, the pitch radius of the first stopper hole and that of the second stopper hole are set to be different from each other. Hence, both stopper holes interposing therebetween each first window hole are enabled to approach each other. Specifically, for instance, when a pair of first stopper holes and a pair of second stopper holes are provided, an angle formed by a rotational axis and stop pins interposing therebetween each first window hole can be set to approach 90 degrees, whereby inhomogeneity in strength of the second rotor can be inhibited.

(5) Preferably, the first rotor includes a plurality of second window portions provided radially inside the plurality of first window portions. Besides, preferably, the second rotor includes a plurality of second window holes provided radially inside the plurality of first window holes. In this case, the damper device further includes a plurality of second elastic members accommodated in a plurality of pairs of the second window portion and the second window hole. The plurality of second elastic members elastically couple the first rotor and the second rotor in a rotational direction. Furthermore, the each of the first and second stopper holes extends at an end thereof located farther from the each of the plurality of first window holes to a position radially outside one of the plurality of second window holes.

In this case, the second window portions and the second window holes are provided in radial positions displaced from the first window portions and the first window holes. Besides, each of the first and second stopper holes extends at one end thereof to the position radially outside one of the second window holes. Hence, both stopper holes can be elongated in the circumferential direction.

(6) Preferably, the each of the plurality of first window holes includes a pair of pressing surfaces on both circumferential ends thereof. One of the pair of pressing surfaces, located closer to the first stopper hole, includes a protruding portion protruding to bulge toward the other opposed to the one of the pair of pressing surfaces. In this case, the first stopper hole extends toward the protruding portion at an end thereof located closer to the each of the plurality of first window holes.

Here, the first stopper hole can be extended at one end thereof enough to cut into the protruding portion of each first window hole. Therefore, the first stopper hole can be further elongated in the circumferential direction.

Overall, according to the present invention described above, a circumferentially elongated stopper hole can be formed as a component of a stopper mechanism in a damper device; good performance of attenuating rotational fluctuations can be obtained by the damper device.

DETAILED DESCRIPTION

First Preferred Embodiment

[Entire Configuration]

Figure 1:
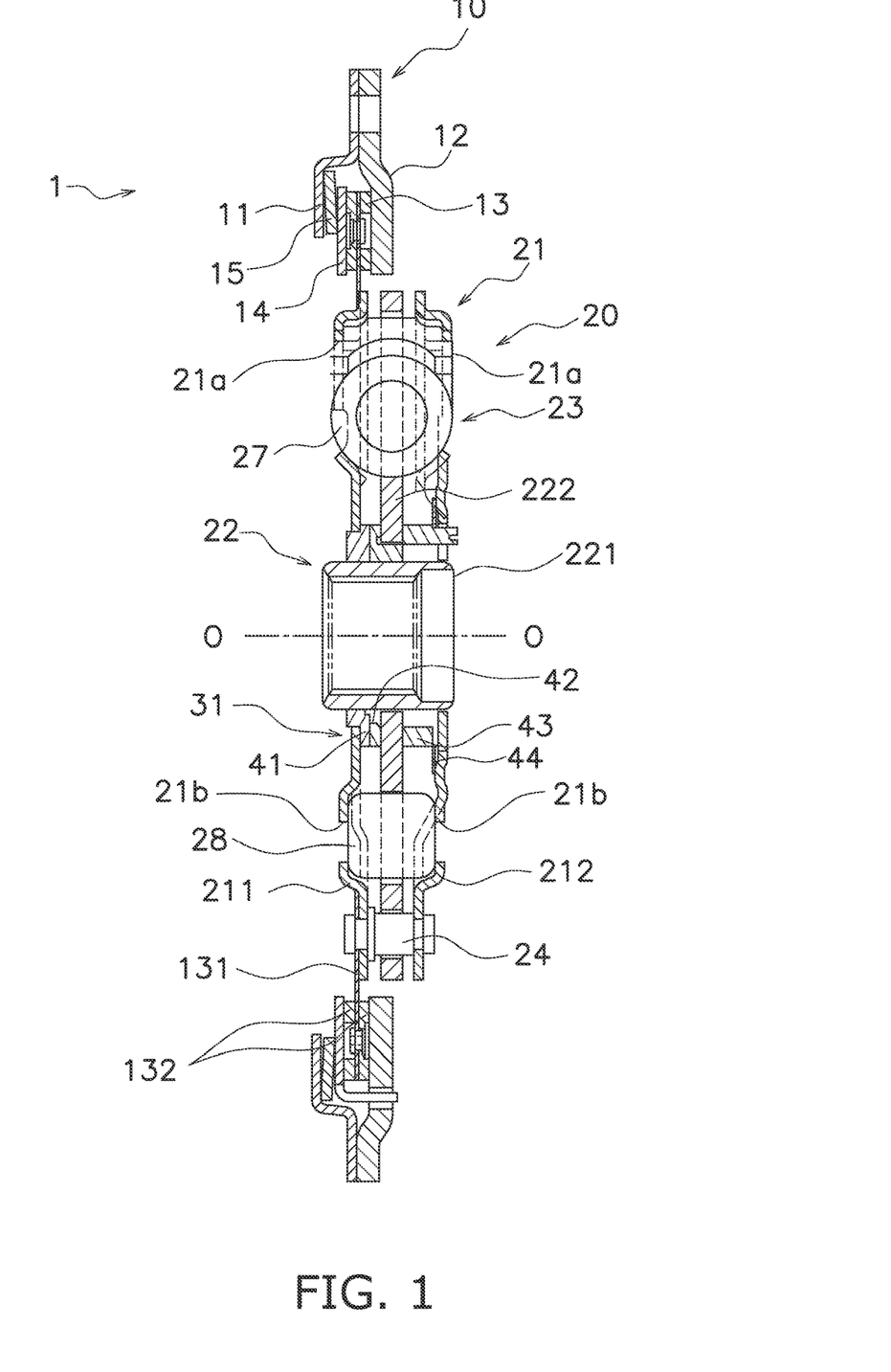
FIG. 1 is a cross-sectional view of a torque limiter embedded damper device according to a first preferred embodiment of the present invention.
Figure 2:
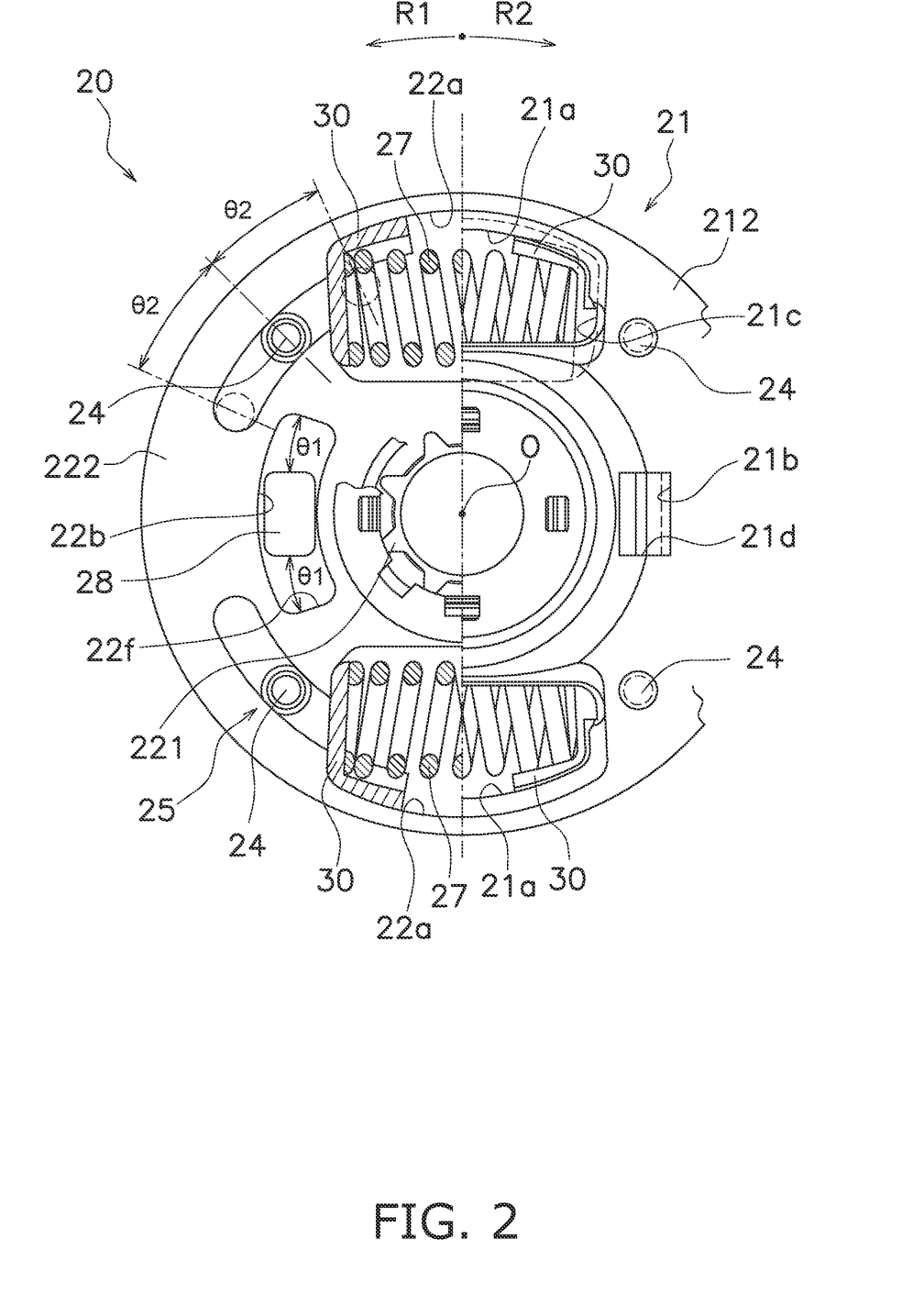
FIG. 2 is a front view of a damper unit of the damper device shown in FIG. 1.

FIG. 1 is a cross-sectional view of a torque limiter embedded damper device 1 (hereinafter simply referred to as "damper device 1") according to a preferred embodiment of the present invention. On the other hand, FIG. 2 is a front view of the damper device 1 in a condition that some constituent members are detached therefrom or are not illustrated in part. In FIG. 1, line O-O indicates a rotational axis. In FIG. 1, an engine is disposed on the left side of the damper device 1, whereas a drive unit, including an electric motor, a transmission and so forth, is disposed on the right side of the damper device 1.

It should be noted that in the following explanation, the term "axial direction" refers to an extending direction of the rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on a window portion and a window hole, both of which are illustrated in an upper part of FIG. 2. Likewise, the radial direction is not required to be perfectly matched with a diameter direction of the imaginary circle about the rotational axis O, and is conceptualized as encompassing, for instance, an up-and-down direction defined based on the window portion and the window hole, both of which are illustrated in the upper part of FIG. 2.

The damper device 1 is a device provided between a flywheel and an input shaft of the drive unit (both of which are not illustrated in the drawings) in order to limit a torque transmitted between the engine and the drive unit and attenuate rotational fluctuations. The damper device 1 includes a torque limiter unit 10 and a damper unit 20.

[Torque Limiter Unit 10]

The torque limiter unit 10 is disposed on the outer peripheral side of the damper unit 20. The torque limiter unit 10 limits a torque transmitted between the flywheel and the damper unit 20. The torque limiter unit 10 includes first and second side plates 11 and 12, a friction disc 13, a pressure plate 14 and a cone spring 15.

The first and second side plates 11 and 12 are fixed to each other by a plurality of rivets. The friction disc 13 includes a core plate 131 and a pair of friction members 132. The pressure plate 14 and the cone spring 15 are disposed between the first side plate 11 and the friction disc 13. The cone spring 15 presses the friction disc 13 onto the second side plate 12 through the pressure plate 14.

[Damper Unit 20]

The damper unit 20 is composed of an input-side plate 21 (exemplary first rotor), a hub flange 22 (exemplary second rotor) and a damper part 23 disposed between the input-side plate 21 and the hub flange 22.

<Input-Side Plate 21>

The input-side plate 21 includes a first plate 211 and a second plate 212 (both of which will be hereinafter collectively referred to as "the input-side plate 21" on an as-needed basis). Each of the first and second plates 211 and 212 is an annular member having a center hole. As shown in FIG. 2, the first and second plates 211 and 212 are fixed to each other at a predetermined axial interval by four stop pins 24. Therefore, the first and second plates 211 and 212 are immovable relative to each other in both axial and rotational directions. Besides, the core plate 131 of the friction disc 13 is fixed at the inner peripheral part thereof to the first plate 211 by the stop pins 24.

Each of the first and second plates 211 and 212 is provided with a pair of first window portions 21*a* and a pair of second window portions 21*b*. The pair of first window portions 21*a* is disposed in opposition to each other through the rotational axis O. FIG. 2 depicts the pair of first window portions 21*a* and one of the pair of second window portions 21*b* in the second plate 212, but the configurations of the window portions 21*a* and 21*b* are similarly true of those in the first plate 211.

The pair of first window portions 21*a* is formed by cutting and raising each plate 211, 212. Each first window portion 21*a* includes a pair of pressing surfaces 21*c* on both circumferential end surfaces thereof and includes a pair of support portions on the outer and inner peripheral edges thereof. Besides, the pair of second window portions 21*b* is disposed in opposition to each other through the rotational axis O, while shifting at an angular interval of 90 degrees from the pair of first window portions 21*a*. The pair of second window portions 21*b* is a pair of rectangular openings axially penetrating each plate 211, 212, and each includes a pair of pressing surfaces 21*d* on both circumferential end surfaces thereof <Hub Flange 22>

The hub flange 22 is a member for transmitting a torque, inputted thereto from the input-side plate 21, to an output-side device. The hub flange 22 includes a hub 221 and a flange 222. As shown in FIG. 2, the hub 221 and the flange 222 are integrated by a plurality of teeth and a plurality of recesses with which the plural teeth are meshed.

The hub 221 is a tubular member and is disposed within the center holes of the first and second plates 211 and 212. The hub 221 is provided with a spline hole in the inner peripheral part thereof, whereby an output-side member is capable of being spline-coupled to the spline hole.

Figure 3:
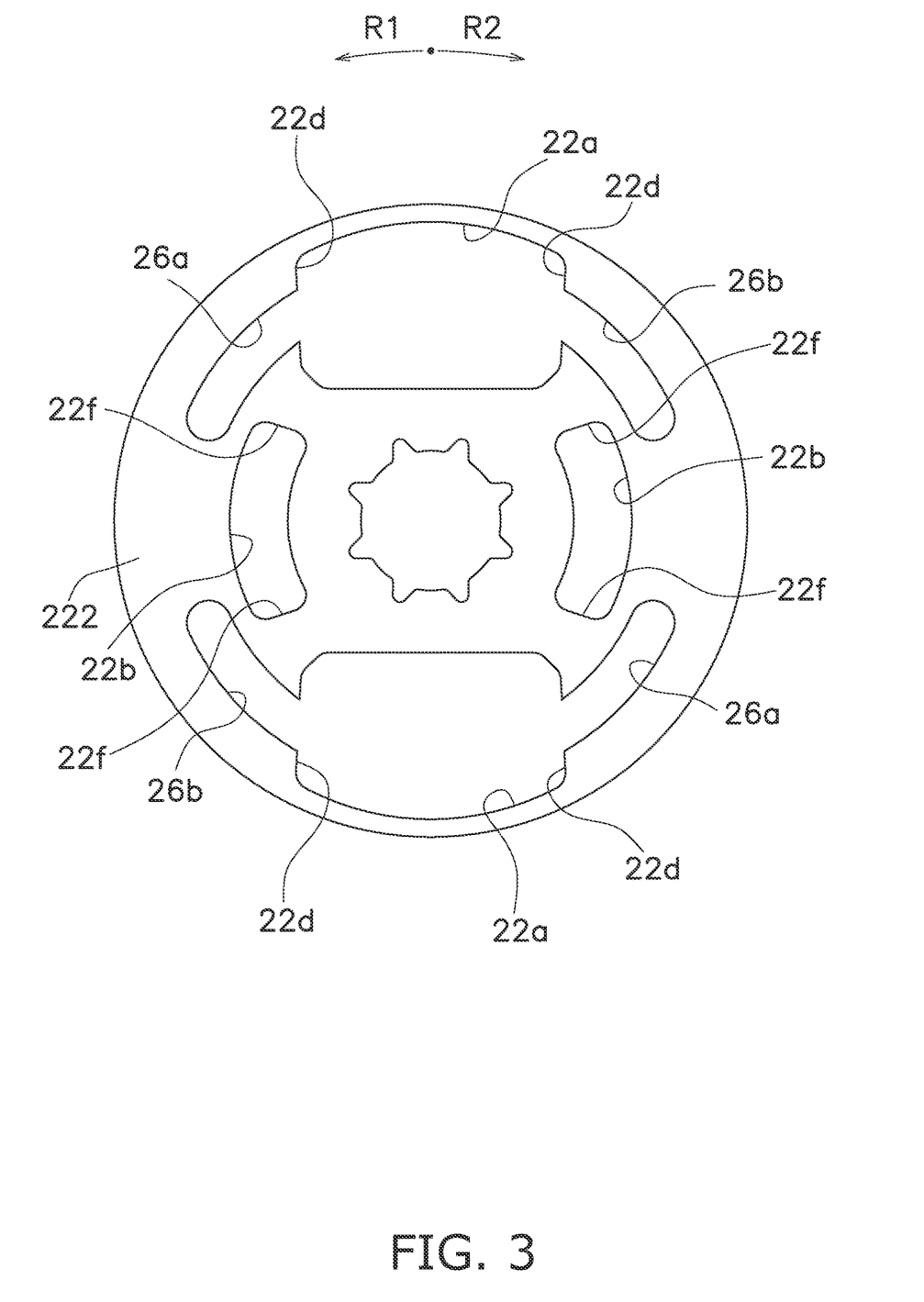
FIG. 3 is a front view of a flange shown in FIG. 1.

As shown in FIGS. 2 and 3, the flange 222 is made in the shape of a disc and is disposed axially between the first plate 211 and the second plate 212. The flange 222 includes a center hole, a pair of first window holes 22*a*, a pair of second window holes 22*b*, a pair of first stopper holes 26*a* and a pair of second stopper holes 26*b*.

The pair of first window holes 22*a* is disposed in opposition to each other through the rotational axis O, while being provided in corresponding positions to the pair of first window portions 21*a* of the first plate 211 and that of the second plate 212. Each first window hole 22*a* includes a pair of pressing surfaces 22*d* on both circumferential end surfaces thereof. Each first window hole 22*a* is herein provided with the pair of pressing surfaces 22*d* only on radially inner and outer parts thereof, while communicating at a radially intermediate part thereof with one end of each first stopper hole 26*a* and that of each second stopper hole 26*b*.

The pair of second window holes 22*b* is disposed in opposition to each other through the rotational axis O, while shifting at an angular interval of 90 degrees from the pair of first window holes 22*a*. In other words, the pair of second window holes 22*b* is provided in corresponding positions to the pair of second window portions 21*b* of the first plate 211 and that of the second plate 212. Each second window hole 22*b* is made in the shape of a circular arc, and a pitch radius (a radius at the middle position of the radial width) of each second window hole 22*b* is defined radially inside the radially center position in each first window hole 22*a*. Each second window hole 22*b* includes a pair of pressing surfaces 22*f* on both circumferential end surfaces thereof, the distance between the pair of pressing surfaces 22*f* is set to be longer than that between the pair of pressing surfaces 21*d* of each second window portion 21*b* in the input-side plate 21.

The pair of first stopper holes 26*a* is a pair of elongated holes each provided in the shape of a circular arc on a circumferentially R1 side (hereinafter referred to as "R1 side", see FIGS. 2 and 3) of each first window hole 22*a*. Each first stopper hole 26*a* extends at the R1-side end thereof to a position radially outside the second window hole 22*b* near thereto. Besides, each first stopper hole 26*a* communicates at an R2-side end (i.e., a first window hole 22*a*-side end) thereof with the radially intermediate part of each first window hole 22*a*.

On the other hand, the pair of second stopper holes 26*b* is a pair of elongated holes each provided in the shape of a circular arc on a circumferentially R2 side (hereinafter referred to as "R2 side", see FIGS. 2 and 3) of each first window hole 22*a*. Each second stopper hole 26*b* extends at the R2-side end thereof to a position radially outside the second window hole 22*b* near thereto. Besides, each second stopper hole 26*b* communicates at an R1-side end (i.e., a first window hole 22*a*-side end) thereof with the radially intermediate part of each first window hole 22*a*.

In the configuration described above, each stopper hole 26*a*, 26*b* can be shaped to extend longer at the first window hole 22*a*-side end thereof than that shaped not to communicate with the first window hole 22a adjacent thereto. As a result, the actuation range of a stopper mechanism 25 (to be described) can be widened. Besides, the angle formed by the rotational axis O and each pair of stop pins 24 interposing therebetween each first window hole 22a can be set to approach 90 degrees, whereby inhomogeneity in strength of the input-side plate 21 and the flange 222 can be prevented.

The first stopper holes 26a and the second stopper holes 26b are axially penetrated by the stop pins 24, respectively. Because of this, the input-side plate 21 and the hub flange 22 are rotatable relative to each other within a range that each stop pin 24 is movable within each stopper hole 26a, 26b. In other words, the stop pins 24 and the stopper holes 26a and 26b compose a stopper mechanism 25. The input-side plate 21 and the hub flange 22 are prevented from rotating relative to each other when each stop pin 24 makes contact with one end surface of each stopper hole 26a, 26b.

<Damper Part 23>

The damper part 23 is a mechanism for elastically coupling the input-side plate 21 and the hub flange 22 in the rotational direction. As shown in FIGS. 1 and 2, the damper part 23 includes two coil springs 27, two resin members 28, two pairs of spring seats 30, each pair of which supports both end surfaces of each coil spring 27, and a hysteresis generating mechanism 31 (see FIG. 1).

The coil springs 27 are accommodated in the pair of first window holes 22a of the flange 222, respectively, whereas the resin members 28 are accommodated in the pair of second window holes 22b of the flange 222, respectively. Besides, the coil springs 27 are axially and radially supported by the pair of first window portions 21a of the first plates 211 and that of the second plates 212, respectively, whereas the resin members 28 are axially and radially supported by the pair of second window portions 21b of the first plate 211 and that of the second plate 212.

It should be noted that each resin member 28 is disposed in each second window portion 21b of the input-side plate 21 without any circumferential gap. On the other hand, each resin member 28 is shorter than the circumferential width of each second window hole 22b of the flange 222. In other words, in a neutral state without relative rotation between the input-side plate 21 and the hub flange 22 (i.e., the torsion angle is "0"), gaps (to be described below in detail) are produced between both ends of each resin member 28 and the pair of pressing surfaces 22f of each second window hole 22b of the flange 222.

Each pair of spring seats 30 is disposed on both circumferential ends of each first window hole 22a of the flange 222. Each pair of spring seats 30 supports the end surfaces of each coil spring 27 and supports part of the outer peripheral part (both circumferential ends) of each coil spring 27. Because of this, each coil spring 27 is accommodated in each first window portion 21a of the first plate 211, that of the second plate 212, and each first window hole 22a of the flange 222 through each pair of spring seats 30 without any circumferential gap.

The hysteresis generating mechanism 31 is disposed axially between the hub flange 22 and the first and second plates 211 and 212. As shown in FIG. 1, the hysteresis generating mechanism 31 includes a first bushing 41, a second bushing 42, a third bushing 43 and a cone spring 44.

The first and second bushings 41 and 42 are disposed on the outer peripheral surface of the hub 221, while being disposed axially between the flange 222 and the inner peripheral end of the first plate 211. The second bushing 42 is engaged with the hub 221, while being non-rotatable relative thereto. The second bushing 42 makes contact by friction with the first bushing 41. The third bushing 43 is disposed axially between the flange 222 and the inner peripheral end of the second plate 212. The third bushing 43 is engaged with the second plate 212, while being non-rotatable relative thereto. The third bushing 43 makes contact by friction with the flange 222. The cone spring 44 is disposed in a compressed state between the third bushing 43 and the second plate 212.

Due to the configuration described above, when the hub flange 22 and the first and second plates 211 and 212 are rotated relative to each other, a hysteresis torque is generated.

[Action]

A torque, transmitted from the engine to the flywheel, is inputted to the damper unit 20 through the torque limiter unit 10. In the damper unit 20, the torque is inputted to the input-side plate 21 to which the friction disc 13 of the torque limiter unit 10 is fixed, and is then transmitted to the hub flange 22 through the coil springs 27 and the resin members 28. Subsequently, power is transmitted from the hub flange 22 to the electric motor, the transmission, a power generator and so forth disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 10.

<Positive-Side Torsional Characteristics>

Explanation will be given for positive-side torsional characteristics obtained in the damper unit 20, namely, characteristics obtained when a torque is inputted from the engine (i.e., in input of a positive-side torque).

When the positive-side torque is inputted, the input-side plate 21 is rotated in an R1 direction in FIG. 2. Because of this, each of the two coil springs 27 is compressed between the spring seat 30 supported by the R2-side pressing surface 21c of each first window portion 21a in each plate 211, 212 composing the input-side plate 21 and the spring seat 30 supported by the R1-side pressing surface 22d of each first window hole 22a in the flange 222.

It should be noted that, although each resin member 28 is supported by each second window portion 21b of each plate 211, 212 composing the input-side plate 21 without any gap in the neutral state, circumferential gaps, each corresponding to a torsion angle θ1, are produced on the R1 and R2 sides of each resin member 28 in each second window hole 22b of the flange 222. On the other hand, a circumferential gap, corresponding to a torsion angle θ2, is produced on the R1 or R2 side of each stop pin 24 in each stopper hole 26a, 26b. Here, the circumferential gaps (hereinafter simply referred to as "gaps") are set to establish the following relation.

θ1<θ2

Figure 4:
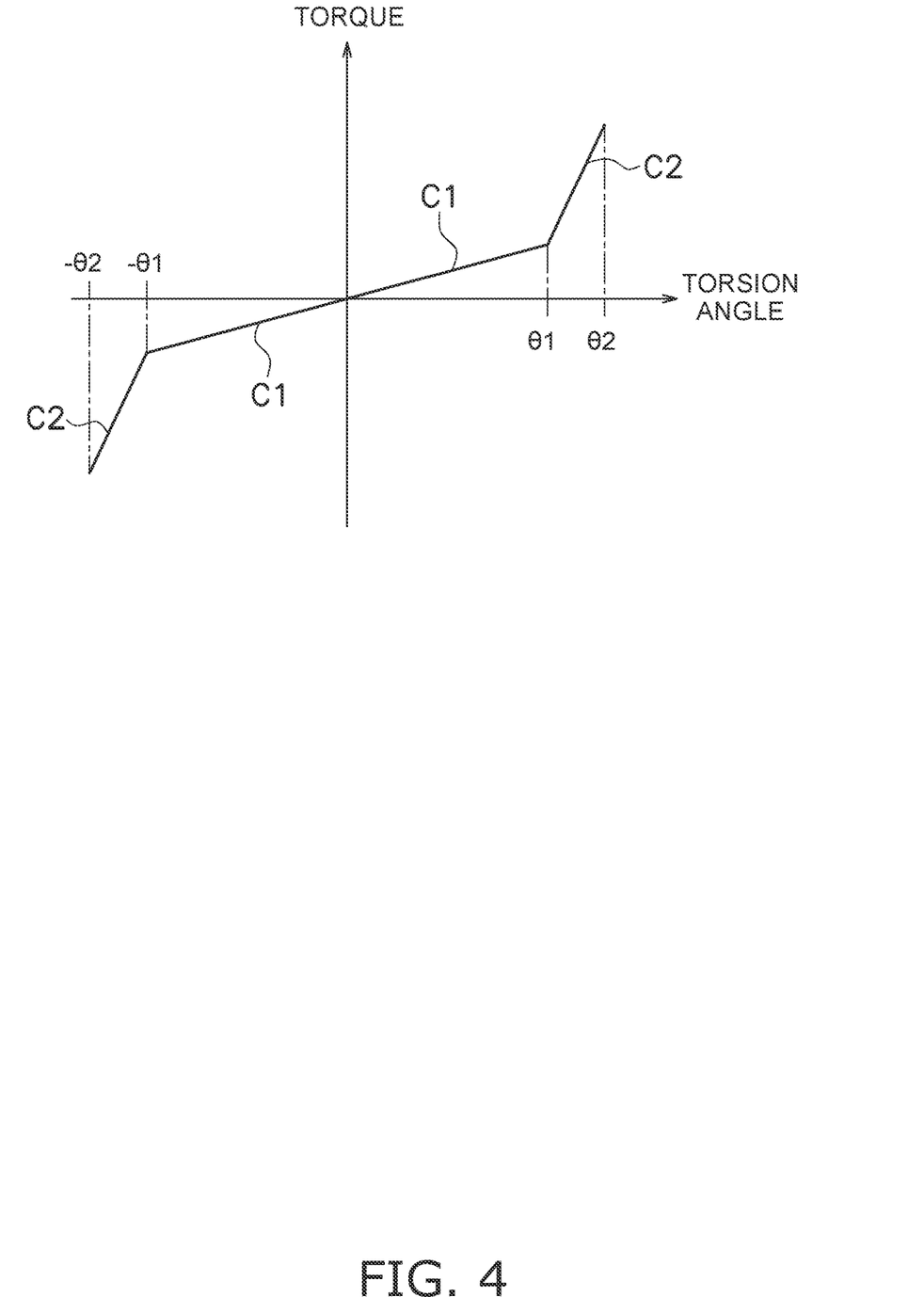
FIG. 4 is a chart showing torsional characteristics of the damper device according to the first preferred embodiment.

Due to the gap settings described above, each resin member 28 is not compressed until the torsion angle between the input-side plate 21 and the hub flange 22 reaches θ1 (it should be noted that the term "torsion angle" hereinafter refers to the torsion angle between the input-side plate and the hub flange). When the torsion angle exceeds θ1, each resin member 28 is compressed as well. Because of this, the positive-side torsional characteristics are obtained as shown in FIG. 4; characteristic C1 is obtained until the torsion angle reaches θ1, whereas characteristic C2 is obtained after the torsion angle reaches θ1.

Then, when the torsion angle reaches θ2, each stop pin 24, disposed in each first stopper hole 26a, makes contact with the R1-side end surface of each first stopper hole 26a, whereby the input-side plate 21 and the hub flange 22 are prevented from rotating relative to each other.

<Negative-Side Torsional Characteristics>

Explanation will be given for negative-side torsional characteristics obtained in the damper unit 20, namely, characteristics obtained when a torque is inputted reversely from the drive unit (i.e., in input of a negative-side torque).

When the negative-side torque is inputted, the hub flange 22 is rotated in the R1 direction with respect to the input-side plate 21 in FIG. 2. Because of this, each of the two coil springs 27 is compressed between the spring seat 30 attached to the R2-side pressing surface 22d of each first window hole 22a in the hub flange 22 and the spring seat 30 attached to the R1-side pressing surface 21c of each first window portion 21a in each plate 211, 212 composing the input-side plate 21.

Each resin member 28 is actuated in a similar manner to when the positive-side torque is inputted. Specifically, each resin member 28 is not compressed until the torsion angle reaches $-\theta 1$; when or before the torsion angle reaches $-\theta 1$, low-stiffness torsional characteristic C1 is obtained as shown in FIG. 4. Then, when the torsion angle exceeds $-\theta 1$, compression of each resin member 28 begins between the R2-side pressing surface 22f of each second window hole 22b in the hub flange 22 and the R1-side pressing surface 21d of each second window portion 21b in each plate 211, 212 composing the input-side plate 21. Because of this, when the torsion angle exceeds $-\theta 1$, high-stiffness torsional characteristic C2 is obtained as shown in FIG. 4.

When the torsion angle reaches $-\theta 2$, each stop pin 24, disposed in each stopper hole 26b, makes contact with the R2-side end surface of each stopper hole 26b, whereby the input-side plate 21 and the hub flange 22 are prevented from rotating relative to each other.

In the preferred embodiment described above, each stopper hole 26a, 26b communicates with the first window hole 22a adjacent thereto at one-side end thereof close to the adjacent first window hole 22a. Besides, each stopper hole 26a, 26b extends at the other-side end thereof farther from the adjacent first window hole 22a to a position radially outside the second window hole 22b near thereto. Because of this, each stopper hole 26a, 26b can be elongated in the circumferential direction, whereby enlarging the torsion angle between the input-side plate 21 and the hub flange 22 (i.e., widening of angle) is made possible.

Besides, due to a similar reason to the above, the stopper holes 26a and 26b provided on both sides of each first window hole 22a in the flange 222 can be made closer to each other. As a result, the angle formed by the rotational axis O and the stop pins 24 disposed on both sides of each first window hole 22a can be set to approach 90 degrees, whereby inhomogeneity in strength of the input-side plate 21 and the hub flange 22 can be inhibited.

Second Preferred Embodiment

Figure 5:
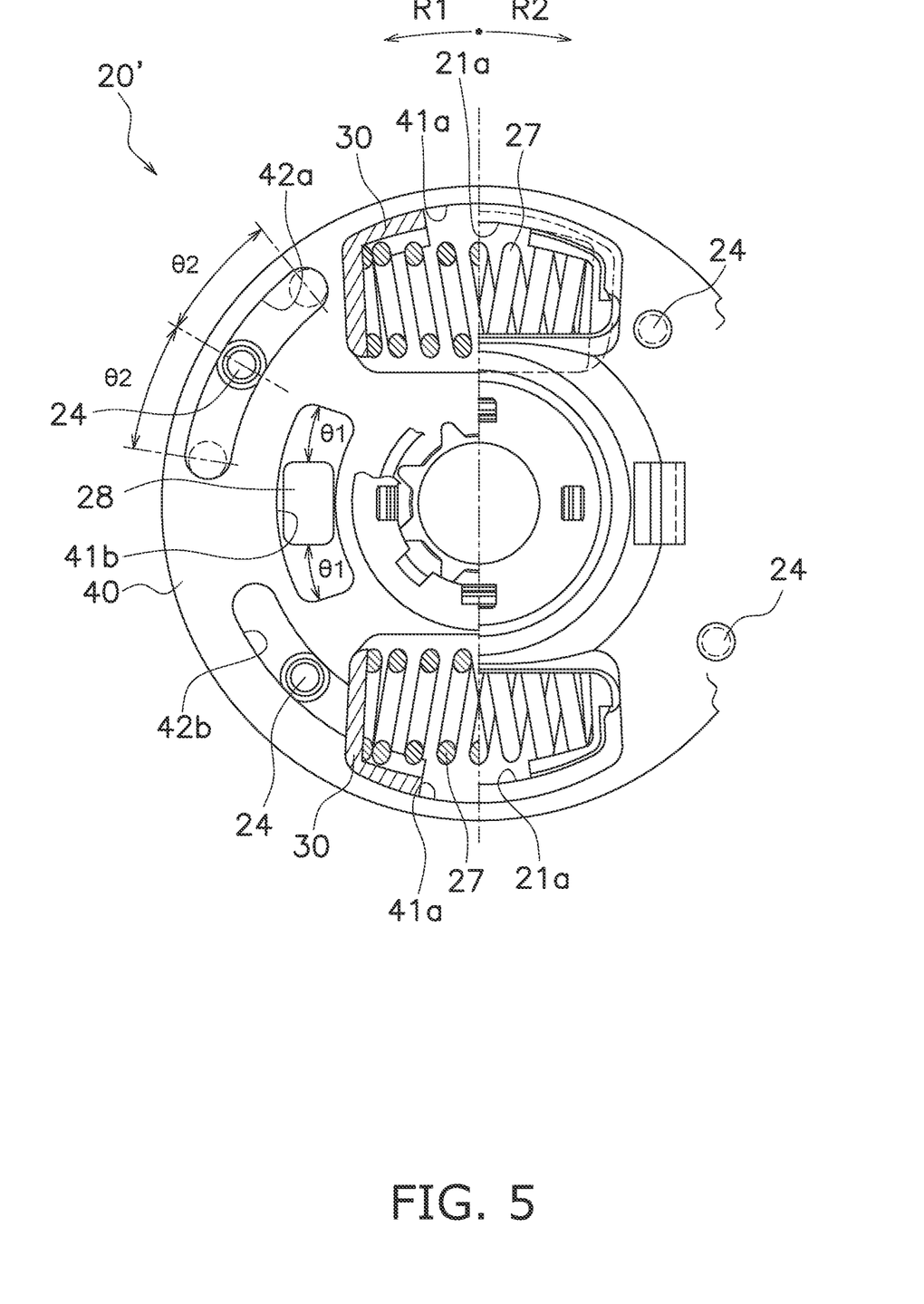
FIG. 5 is a diagram corresponding to FIG. 2 in a second preferred embodiment of the present invention.
Figure 6:
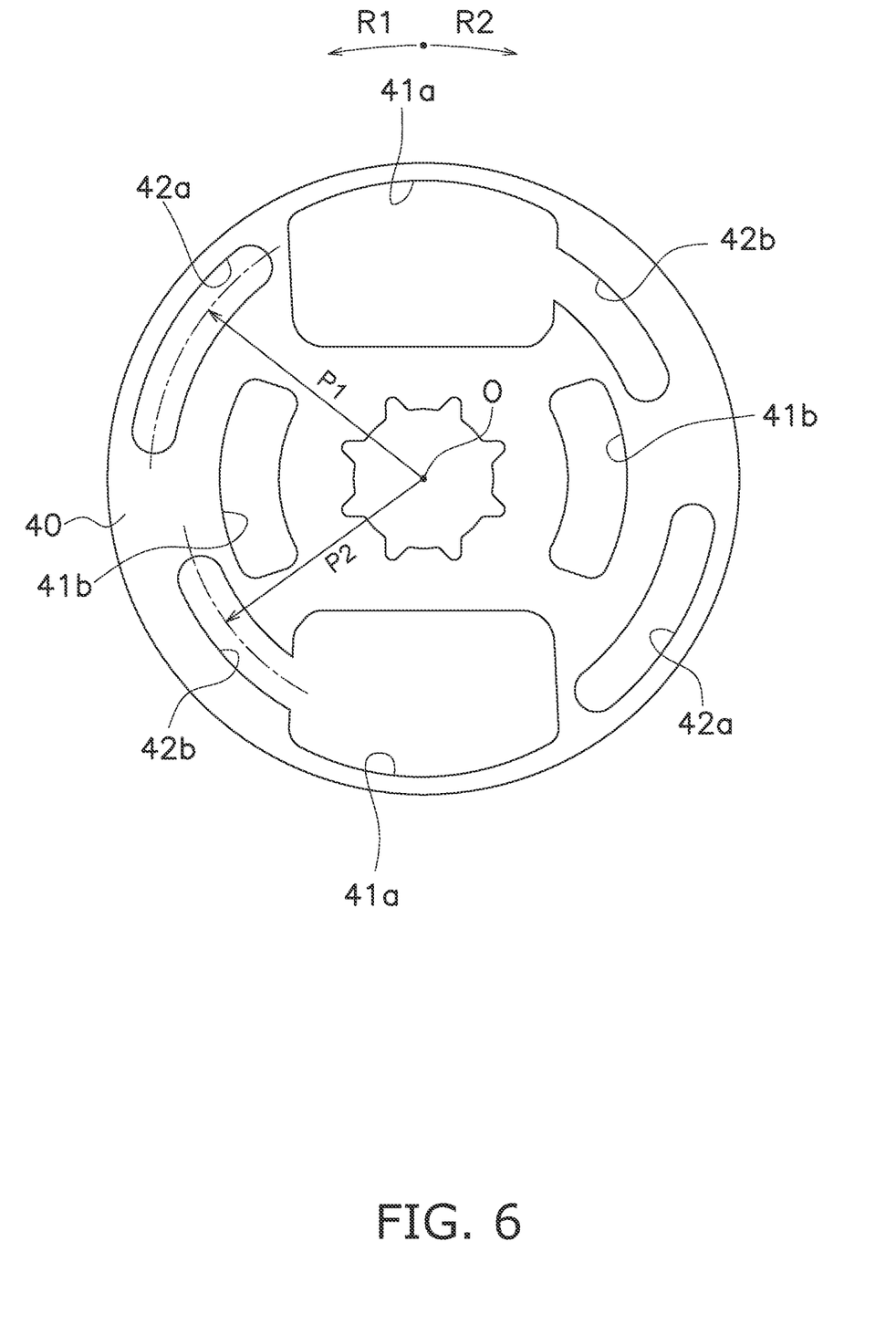
FIG. 6 is a front view of a flange shown in FIG. 5.

FIGS. 5 and 6 shows a damper unit 20' and a flange 40 in a second preferred embodiment of the present invention. The second preferred embodiment is similar to the first preferred embodiment regarding constituent elements except for the flange 40. Besides, the flange 40 is similar to the flange 222 in the first preferred embodiment except for the configurations of first window holes and stopper holes.

The flange 40 includes a center hole, a pair of first window holes 41a, a pair of second window holes 41b, a pair of first stopper holes 42a and a pair of second stopper holes 42b. The layout of the window holes 41a and 41b is similar to that of the corresponding window holes in the first preferred embodiment.

The pair of first stopper holes 42a is a pair of elongated holes each provided in the shape of a circular arc on the circumferentially R1 side of each first window hole 41a. Each first stopper hole 42a is provided apart from each first window hole 41a. In other words, unlike the first preferred embodiment, each first stopper hole 42a does not communicate at the R2-side end thereof with each first window hole 41a. Besides, each first stopper hole 42a extends at the R1-side end thereof to a position radially outside the second window hole 41b near thereto.

On the other hand, the pair of second stopper holes 42b is a pair of elongated holes each provided in the shape of a circular arc on the circumferentially R2 side of each first window hole 41a. Each second stopper hole 42b extends at the R2-side end thereof to a position radially outside the second window hole 41b near thereto, while communicating at the R1-side end thereof with a radially intermediate part of each first window hole 41a.

The second preferred embodiment is similar to the first preferred embodiment regarding torsional characteristics. Hence, in the second preferred embodiment herein described, it is also possible to achieve advantageous effects similar to those achieved in the first preferred embodiment.

Now, the second preferred embodiment is the same as the first preferred embodiment regarding the radial position of the pair of first window holes 41a. However, the second preferred embodiment is different from the first preferred embodiment in that a pitch radius P1 of each first stopper hole 42a (a radius at a radially middle part of each first stopper hole 42a) is greater than a pitch radius P2 of each second stopper hole 42b. In other words, the first stopper holes 42a and the second stopper holes 42b are provided in radial positions displaced from each other.

In the configuration herein described, each first stopper hole 42a, not communicating with the first window hole 41a adjacent thereto, is enabled to be provided as much on the outer peripheral side as possible, whereby the actuation angle of the stopper mechanism can be widened. On the other hand, each second stopper hole 42b is enabled to communicate with an approximately radially middle part of the first window hole 41a adjacent thereto.

Third Preferred Embodiment

FIGS. 7 to 10 show a third preferred embodiment of the present invention. The third preferred embodiment is similar to the second preferred embodiment regarding constituent elements except for a flange 50 and spring seats 55. Besides, the flange 50 is similar to the flange 40 in the second preferred embodiment except for the configurations of first window holes and stopper holes.

Figure 7:
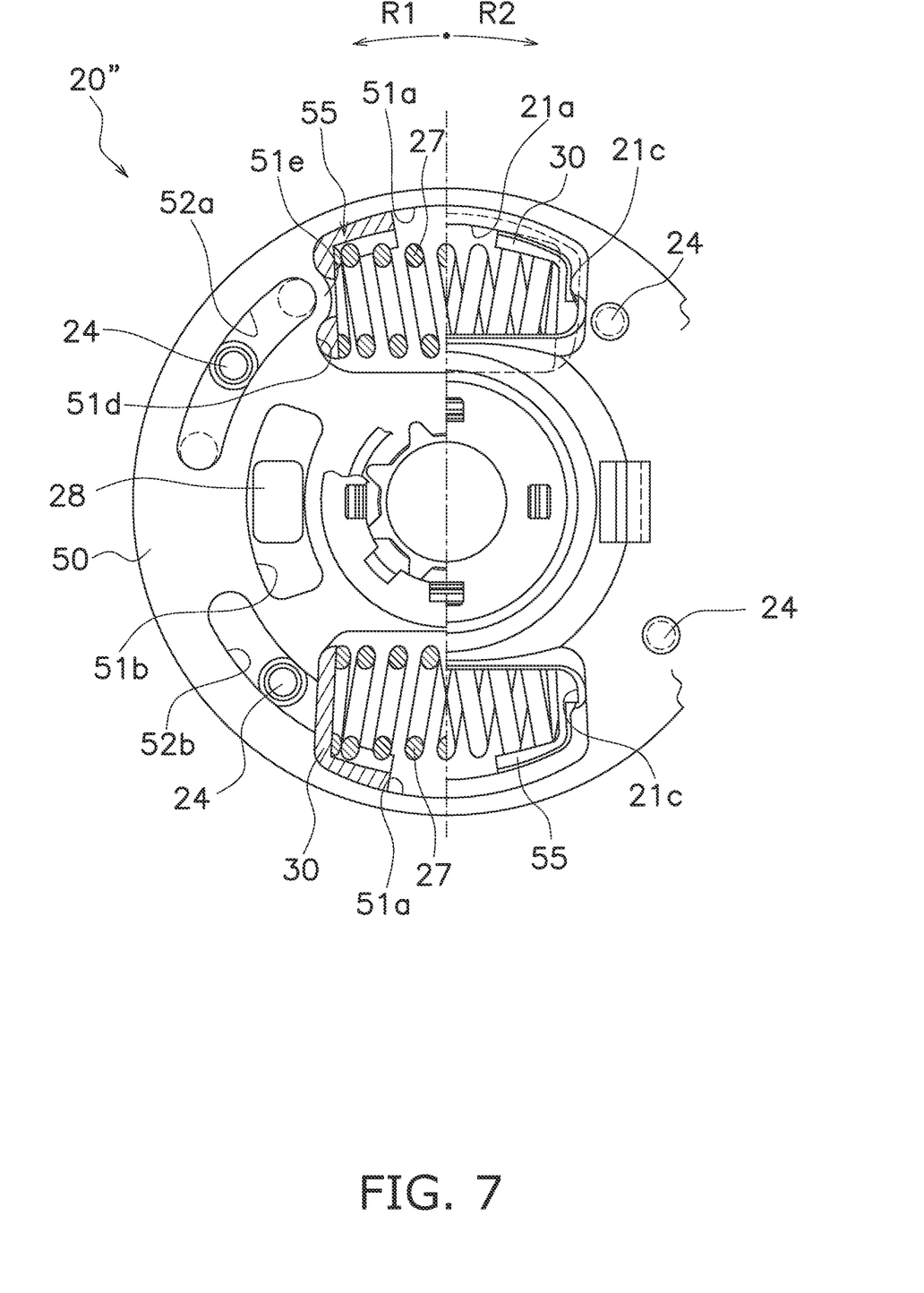
FIG. 7 is a diagram corresponding to FIG. 2 in a third preferred embodiment of the present invention.
Figure 8:
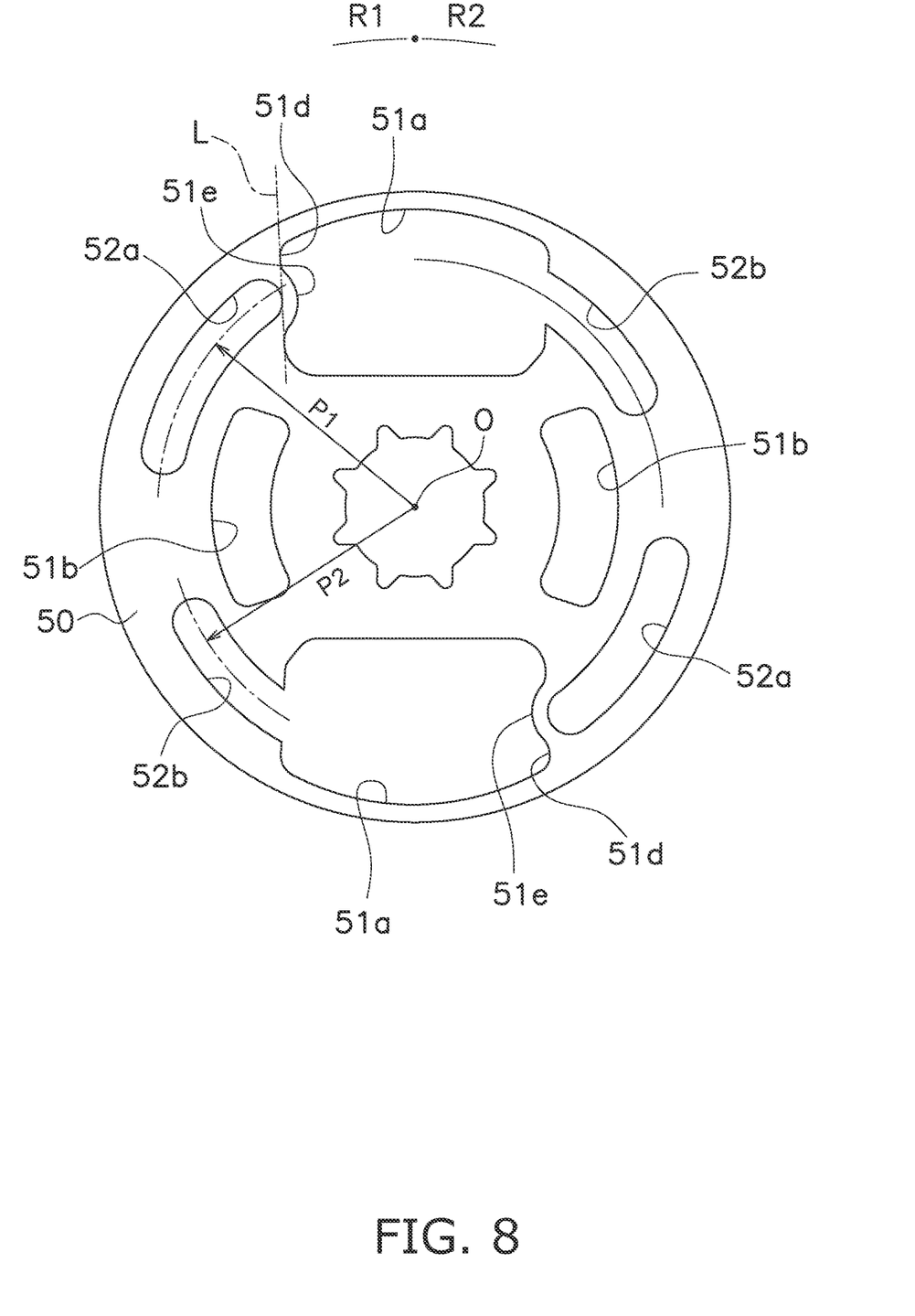
FIG. 8 is a front view of a flange shown in FIG. 7.

The flange 50 includes a center hole, a pair of first window holes 51a, a pair of second window holes 51b, a pair of first stopper holes 52a and a pair of second stopper holes 52b. The layout of the window holes 51a and 51b is similar to that of the corresponding window holes in the first preferred embodiment.

Each first window hole 51a includes a protruding portion 51e on a pressing surface 51d, i.e., R1-side one of a pair of pressing surfaces thereof. The protruding portion 51e protrudes to bulge to the R2 side from a radially middle part of the pressing surface 51d. The pair of second window holes 51b is similar to that in each of the first and second preferred embodiments.

The pair of first stopper holes 52a is a pair of elongated holes each provided in the shape of a circular arc on the circumferentially R1 side of each first window hole 51a. Each first stopper hole 52a is provided apart from each first window hole 51a. In other words, unlike the first preferred embodiment, each first stopper hole 52a does not communicate at the R2-side end thereof with each first window hole 51a. Besides, each first stopper hole 52a extends at the R1-side end thereof to a position radially outside the second window hole 51b near thereto.

On the other hand, each first stopper hole 52a extends at the R2-side end thereof toward the protruding portion 51e of each first window hole 51a. Specifically, each first stopper hole 52a reaches a line segment L at the R-2 side end thereof. The line segment L is herein defined as an imaginary line segment connecting the outer and inner peripheral parts (not provided with the protruding portion 51e) of the pressing surface 51d of each first window hole 51a.

In the configuration described above, each first stopper hole 52a can be shaped to extend longer at the R2-side end thereof than a configuration that each first window hole 51a is not provided with the protruding portion 51e. Besides, each second stopper hole 52b communicates with the first window hole 51a adjacent thereto. Hence, the angle formed by the rotational axis O and each pair of stop pins 24 interposing therebetween each first window hole 51a can be set to approach 90 degrees.

Moreover, each first window hole 51a does not communicate at one end thereof with the first stopper hole 52a adjacent thereto. Hence, degradation in strength of the flange 50 can be inhibited.

Furthermore, the third preferred embodiment is similar to the second preferred embodiment in that a pitch radius P1 of each first stopper hole 52a (a radius at a radially middle part of each first stopper hole 52a) is greater than a pitch radius P2 of each second stopper hole 52b. In other words, the first stopper holes 52a and the second stopper holes 52b are provided in radial positions displaced from each other.

Because of this, each first stopper hole 52a can be extended at the R2-side end thereof toward the radially middle part (i.e., the protruding portion Me) of the first window hole Ma adjacent thereto. On the other hand, each second stopper hole 52b can be communicated at the R1-side end thereof with the radially middle part of the first window hole 51a adjacent thereto.

Figure 9:
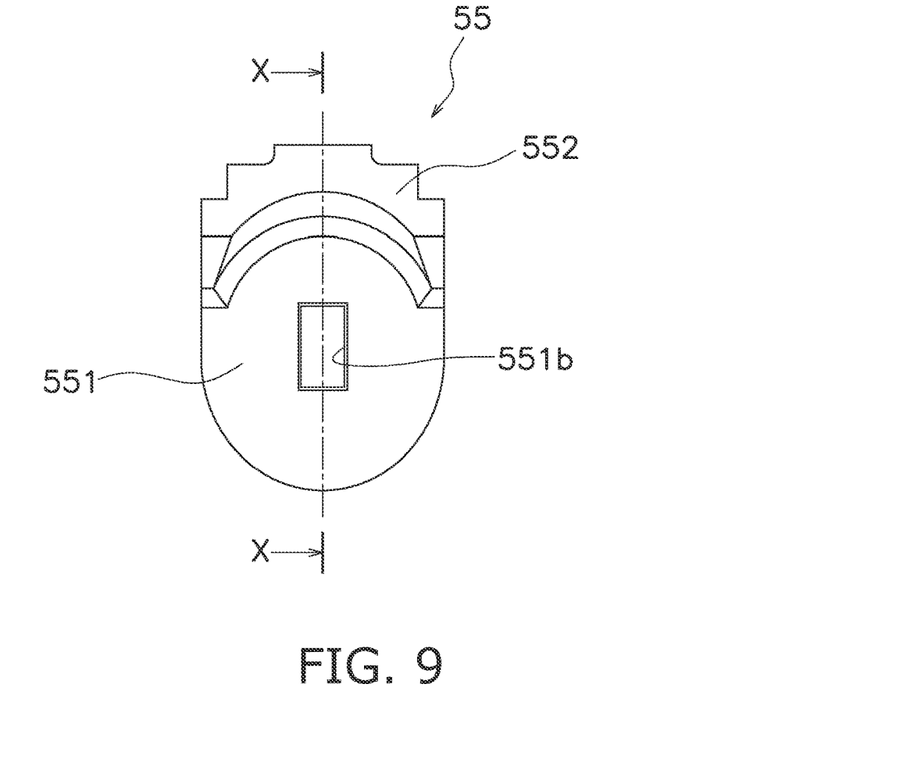
FIG. 9 is a side view of a spring seat in the third preferred embodiment.
Figure 10:
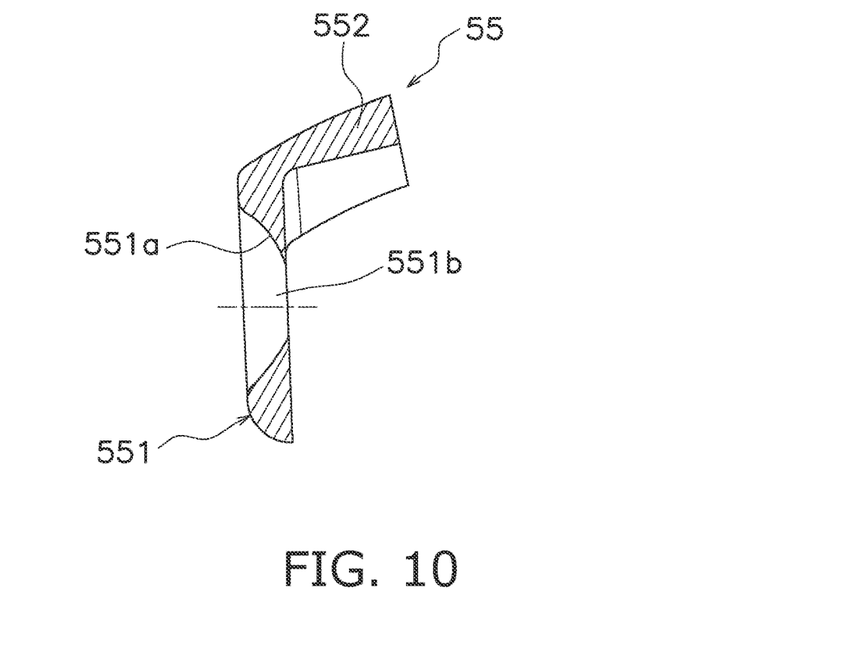
FIG. 10 is a cross-sectional view of FIG. 9 taken along line X-X.

FIGS. 9 and 10 show one of spring seats 55 used in the third preferred embodiment. Each spring seat 55 is disposed on the R1-side end of each first window hole Ma of the flange 50. Each spring seat 55 supports one end surface of each coil spring 27 and supports part of the outer peripheral part (one circumferential end) of each coil spring 27.

As shown in FIGS. 9 and 10, each spring seat 55 includes an end surface support portion 551 and an outer periphery support portion 552. It should be noted that FIG. 9 is a side view of each spring seat 55 (as seen from one side in the circumferential direction), whereas FIG. 10 is a cross-sectional view of FIG. 9 taken along line X-X.

The end surface support portion 551 supports the one end surface of each coil spring 27, while being supported by one of the pair of pressing surfaces 21c of each first window portion 21a of the input-side plate 21 and the pressing surface 51d of each first window hole 51a of the flange 50. As shown in FIG. 10, the end surface support portion 551 is provided with a recess 551a, recessed in the shape of a circular arc, on the surface thereof supported by the pressing surface 51d of each first window hole 51a. Besides, the recess 551a includes a hole 551b circumferentially penetrating a middle part thereof (i.e., a part located in the middle thereof in both radial and axial directions). Furthermore, the protruding portion 51e of each first window hole 51a of the flange 50 is fitted into the recess 551a.

The outer periphery support portion 552 is provided to extend from the outer peripheral end of the end surface support portion 551 in the circumferential direction. The outer periphery support portion 552 is disposed between the outer peripheral part of the one end of each coil spring 27 and both the inner peripheral surface of each first window hole 51a and the inner peripheral surface of each first window portion 21a. Because of this, even when each coil spring 27 is moved to the outer peripheral side either by a centrifugal force or in a compressed state, contact can be avoided between each coil spring 27 and both each first window hole 51a and each first window portion 21a.

It should be noted that similarly to the first and second preferred embodiments, the spring seats 30, each of which is disposed on the R2-side pressing surface of each first window hole 51a, are heretofore known spring seats. Hence, explanation of the spring seats 30 will be hereinafter omitted.

OTHER PREFERRED EMBODIMENTS

The present invention is not limited to the preferred embodiments described above, and a variety of changes or modifications can be made without departing from the scope of the present invention.

(a) In the respective preferred embodiments described above, the spring seats are disposed in the first window holes of the hub flange. However, the spring seats are not indispensable as constituent elements. Instead, the end surfaces of each coil spring and both the pressing surfaces of the input-side plate and those of the flange may be configured to make direct contact with each other.

(b) In the second and third preferred embodiments described above, the pitch radii of the first and second stopper holes are set to be unequal. However, the pitch radii of the first and second stopper holes may be set to be equal.

(c) In the respective preferred embodiments described above, the resin members are attached to the pairs of the second window portion and the second window hole, respectively. Instead, coil springs may be attached thereto.

REFERENCE SIGNS LIST

1 Damper device
21 Input-side plate (first rotor)
21a First window portion
21b Second window portion
22 Hub flange (second rotor)
222, 40, 50 Flange
22a, 41a, 51a First window hole
22b, 41b, 51b Second window hole
24 Stop pin
25 Stopper mechanism
26a, 26b, 42a, 42b, 52a, 52b Stopper hole
27 Coil Spring (elastic member)
28 Resin member (elastic member)
51e Protruding portion

What is claimed is:

1. A damper device, comprising:

a first rotor including a plurality of first window portions;

a second rotor disposed to be rotatable relative to the first rotor, the second rotor including a plurality of first window holes at positions corresponding to positions of the plurality of first window portions;

a plurality of first elastic members, each of which is accommodated in one of the first window portions and a corresponding one of the first window holes, the plurality of first elastic members configured to elastically couple the first rotor and the second rotor in a rotational direction; and a stopper mechanism configured to restrict an angle of relative rotation between the first rotor and the second rotor to a predetermined angular range, wherein the stopper mechanism includes a first stopper hole associated with and provided on a first circumferential side of each of the plurality of first window holes at an interval therefrom, each of the first stopper holes made in shape of a circular arc having a first pitch radius, a second stopper hole associated with, provided on a second circumferential side of, and extending from each of the plurality of first window holes, each of the second stopper holes made in shape of a circular arc having a second pitch radius smaller than the first pitch radius, each of the second stopper holes communicating with the first window hole from which it extends at an end thereof located closest to the first window hole from which it extends, and a plurality of stop members fixed to the first rotor, with one of the plurality of stop members axially penetrating each of the first and second stopper holes and being circumferentially movable therein.

2. The damper device according to claim 1, wherein the first rotor includes a plurality of second window portions provided radially inside the plurality of first window portions, the second rotor includes a plurality of second window holes provided radially inside the plurality of first window holes, the damper device further comprises a plurality of second elastic members, each of which is accommodated in one of the second window portions and a corresponding one of the second window holes, the plurality of second elastic members configured to elastically couple the first rotor and the second rotor in the rotational direction, and each of the first and second stopper holes extends at an end thereof located farthest from the first window hole from which it extends to a position radially outside one of the plurality of second window holes.

3. The damper device according to claim 1, wherein each of the plurality of first window holes includes first and second pressing surfaces on first and second circumferential ends thereof, with the first pressing surface including a protruding portion; the first pressing surface being located closer to the first stopper hole associated with the first window hole than to the second stopper hole associated with the first window hole; and the protruding portion protruding to bulge toward the second pressing surface, which is opposed to the first pressing surface, and the first stopper hole extends toward the protruding portion at an end thereof that is located closest to the first window with which the first stopper hole is associated.

4. A damper device, comprising:

a first rotor including a plurality of first window portions and a plurality of second window portions, the plurality of first window portions disposed radially outside the plurality of second window portions;

a second rotor disposed to be rotatable relative to the first rotor, the second rotor including a plurality of first window holes at positions corresponding to positions of the plurality of first window portions and a plurality of second window holes at positions corresponding to positions of the second window portions, the plurality of first window holes disposed radially outside the plurality of second window holes;

a plurality of elastic members, some of which are each accommodated in one of the first window portions and a corresponding one of the first window holes and some of which are each accommodated in one of the second window portions and a corresponding one of the second window holes, the plurality of elastic members configured to elastically couple the first rotor and the second rotor in a rotational direction; and a stopper mechanism configured to restrict an angle of relative rotation between the first rotor and the second rotor to a predetermined angular range, wherein the stopper mechanism includes a first stopper hole provided on a first circumferential side of each of the plurality of first window holes of the second rotor so as to circumferentially extend therefrom, each of the first stopper holes communicating with the first window hole from which it extends at a first end thereof that is closest to the first window hole from which it extends, and each of the first stopper holes extending at a second end thereof that is located farthest from the first window hole from which it extends to a position radially outside one of the plurality of second window holes, a second stopper hole provided on a second circumferential side of each of the plurality of first window holes of the second rotor so as to circumferentially extend therefrom, and a plurality of stop members fixed to the first rotor, with one of the plurality of stop members axially penetrating each of the first and second stopper holes and being circumferentially movable therein.

5. The damper device according to claim 4, wherein each of the second stopper holes communicates with the first window hole from which it extends at a first end thereof that is located closest to the first window hole from which it extends, and each of the second stopper holes extends at a second end therefore that is located farthest from the first window hole from which it extends to a position radially outside another of the plurality of second window holes.

6. The damper device according to claim 5, wherein the first and second stopper holes are made in shape of circular arcs having pitch radii equal to each other.

* * * * *